United States Patent [19]

Saito et al.

[11] 4,423,504
[45] Dec. 27, 1983

[54] HEIGHT POSITION ADJUSTING DEVICE FOR A REPRODUCING TRANSDUCER IN A ROTARY RECORDING MEDIUM REPRODUCING APPARATUS

[75] Inventors: Takashi Saito, Ayase; Hiroshi Kumei, Yamato, both of Japan

[73] Assignee: Victor Company of Japan, Ltd., Yokohama, Japan

[21] Appl. No.: 289,930

[22] Filed: Aug. 4, 1981

[30] Foreign Application Priority Data

Aug. 6, 1980 [JP] Japan ................................ 55-107928
Aug. 6, 1980 [JP] Japan ........................... 55-111330[U]

[51] Int. Cl.³ .......................... G11B 3/10; G11B 21/24
[52] U.S. Cl. .................................. 369/292; 369/77.2;
369/219; 369/249
[58] Field of Search ................. 369/77, 219, 243, 249,
369/262, 263, 270, 291, 292

[56] References Cited

U.S. PATENT DOCUMENTS 3,390,886 7/1968 Robinow ............................. 369/249
4,342,109 7/1982 Stewart ................................ 369/77

*Primary Examiner*—Steven L. Stephan
*Attorney, Agent, or Firm*—Louis Bernat

[57] ABSTRACT

A height position adjusting device for a reproducing transducer in a rotary recording medium reproducing apparatus which reproduces an information signal recorded in a rotary recording medium by the reproducing transducer which is transferred towards the radial direction of the rotary recording medium, comprises a carriage for supporting the reproducing transducer, where the carriage moves along guide members, and a height position adjusting mechanism for adjusting the height position of the reproducing transducer with respect to the rotary recording medium, by varying the height position of the carriage with respect to the guide members.

1 Claim, 7 Drawing Figures

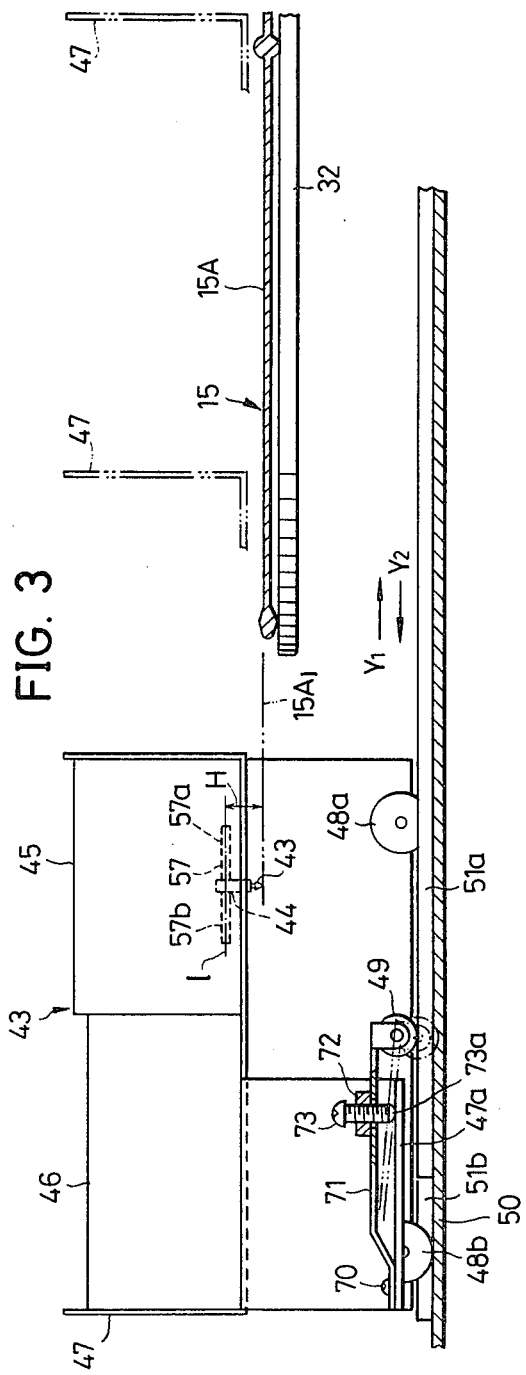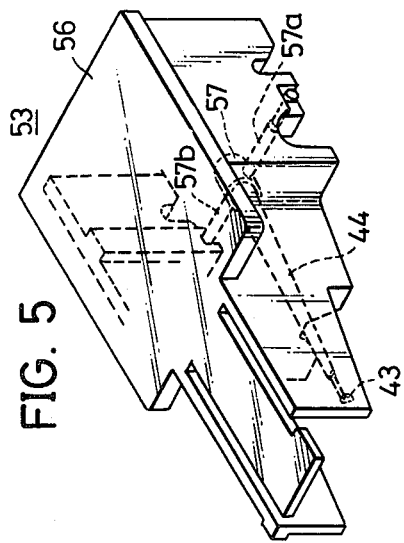

HEIGHT POSITION ADJUSTING DEVICE FOR A REPRODUCING TRANSDUCER IN A ROTARY RECORDING MEDIUM REPRODUCING APPARATUS

BACKGROUND OF THE INVENTION

The present invention generally relates to height position adjusting devices for reproducing transducers in a rotary recording medium reproducing apparatus, and more particularly to a height position adjusting device which is capable of adjusting the position of the reproducing transducer. A reproducing stylus of a pickup device is positioned at an appropriate position with respect to a rotary recording medium in a reproducing apparatus.

Conventionally, apparatus for reproducing rotary recording mediums of a so-called electrostatic capacitance type have been reduced into practical use. In this reproducing apparatus, a reproducing stylus makes contact with and slides along a recorded track of the rotary recording medium (hereinafter simply referred to as a "disc"). An information signal such as a video signal is recorded as variations in a geometrical configuration, to reproduce the recorded signal as variations in electrostatic capacitance between the disc and an electrode of the reproducing stylus. In this type of a rotary recording medium reproducing apparatus, a sliding surface of the reproducing stylus must accurately slide against the disc. A lower edge of an electrode must be in close contact with the surface of the disc, in order to reproduce a high quality signal. Further, in obtaining a reproduced signal of high quality, the stylus pressure of the reproducing stylus with respect to the disc, must be of a predetermined stylus pressure.

The stylus pressure and the position of the reproducing stylus, when the reproducing stylus is making contact with and sliding against the disc, are determined by the height position of a rotary fulcrum of a cantilever with respect to the disc when a pickup cartridge is loaded onto a pickup device.

Conventionally, the assembled position of the pickup cartridge was adjusted and restricted by an adjusting screw on a carriage, when the pickup cartridge is assembled within the carriage. Accordingly, there is no problem in a case where the carriage is at a predetermined height position with respect to a chassis. However, if the height position of the carriage with respect to the chassis is crooked, the height position of the rotary fulcrum of the cantilever, with respect to the disc in a disc reproducing state, is deviated from the predetermined height position. Therefore, a suitable stylus position and stylus pressure cannot be obtained. It is then impossible to accurately reproduce the signal recorded in the disc.

Furthermore, in order to check whether the pickup cartridge is adjusted to the predetermined stylus pressure, conventionally, the adjustment could only be performed by use of a special stylus pressure adjusting device or by actually reproducing the disc to judge the quality of the reproduced signal. Hence, the adjusting operation was troublesome and time consuming.

SUMMARY OF THE INVENTION

Accordingly, it is a general object of the present invention to provide a novel and useful height position adjusting device for a reproducing transducer in a rotary recording medium reproducing apparatus, in which the above described disadvantages have been overcome.

Another and more specific object of the present invention is to provide a height position adjusting device for a reproducing transducer in a rotary recording medium reproducing apparatus, which is provided with a mechanism for adjusting the height position of a carriage assembled with a reproducing transducer which moves along guide rails, with respect to a chassis, that is, with respect to the rotary recording medium. According to the device of the present invention, the height position of the rotary fulcrum of a cantilever from the signal recording surface of the rotary recording medium during reproduction is accurately adjusted. Hence, the recorded signal can be accurately reproduced, since a suitable stylus position and stylus pressure are obtained.

Still another object of the present invention is to provide a height position adjusting device for a reproducing transducer in a rotary recording medium reproducing apparatus, which is provided with means for electrically detecting that the height position of the rotary fulcrum of the cantilever from the signal recording surface of the rotary recording medium has been correctly adjusted. According to the device of the present invention, the height position of the fulcrum of the cantilever can be accurately adjusted.

Other objects and further features of the present invention will be apparent from the following detailed description when read in conjunction with the accompanying drawings.

BRIEF DESCRIPTION OF THE DRAWINGS

FIG. 3 is an elevation showing the device shown in FIG. 2 along lines III—III;

FIG. 5 is a perspective view showing a pickup cartridge which is loaded as indicated in FIG. 4;

DETAILED DESCRIPTION

Figure 1:
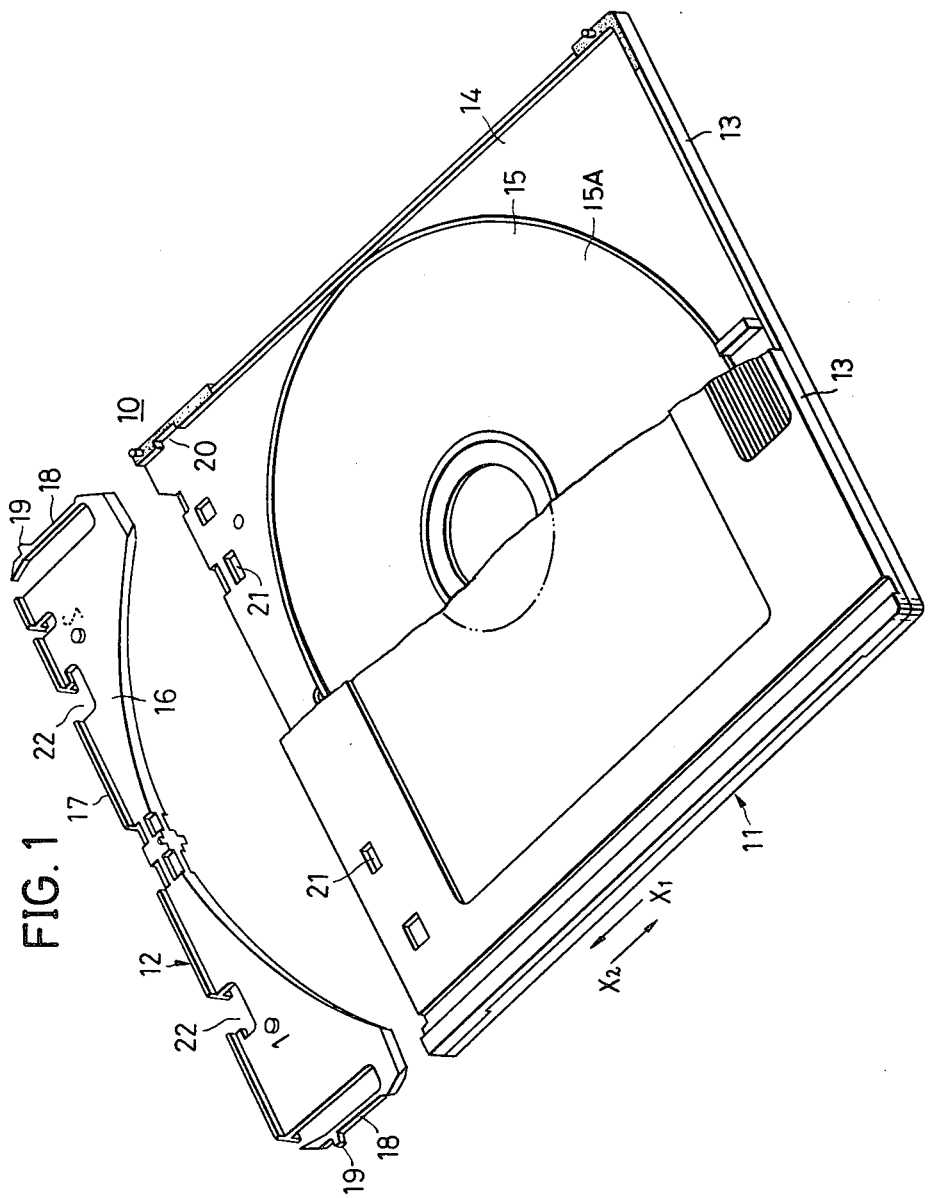
FIG. 1 is a perspective view, with a part cut away, showing an example of a disc case which operates together with a rotary recording medium reproducing apparatus.

In FIG. 1, a disc case 10 comprises a jacket 11 and a lid plate 12. The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
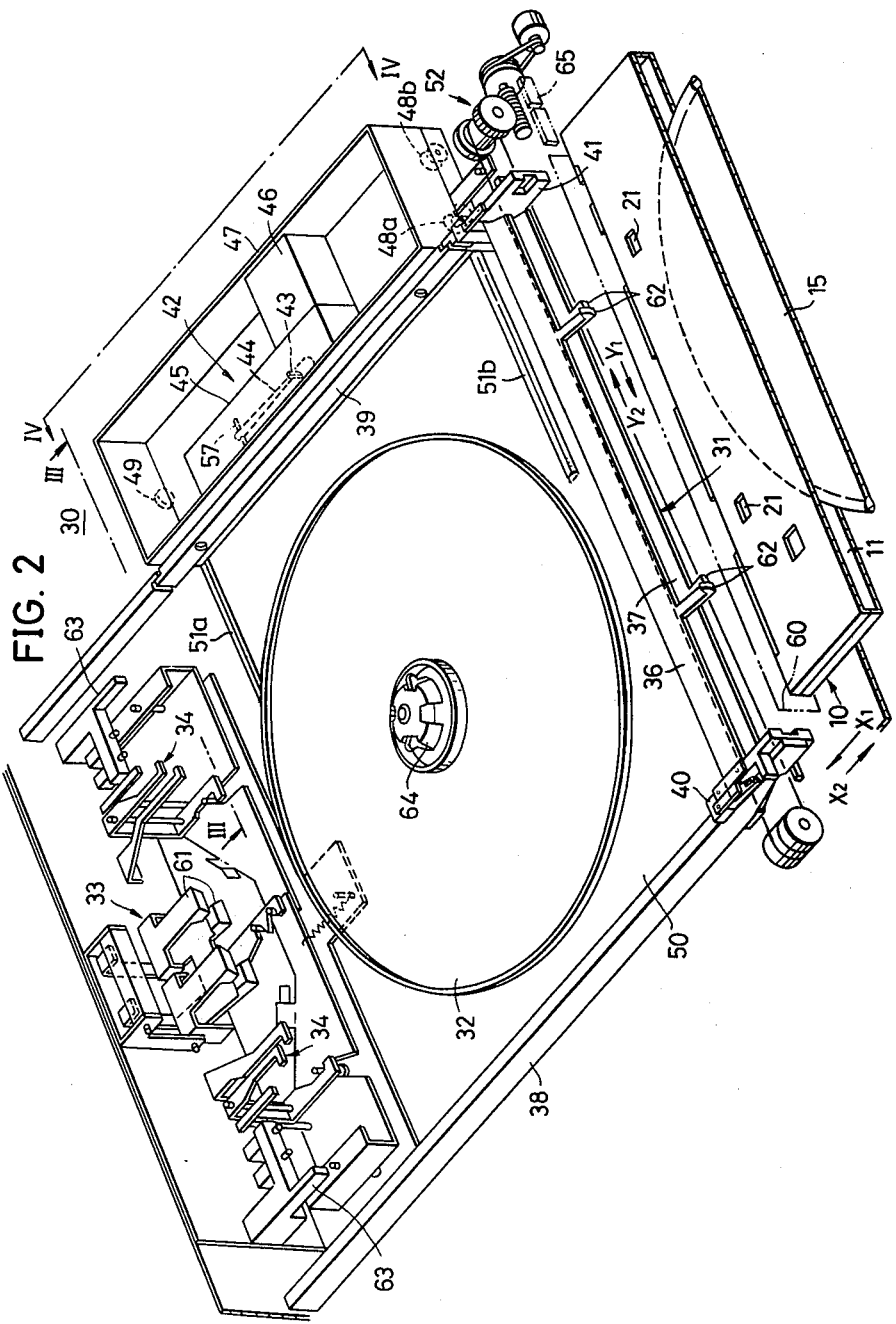
FIG. 2 is a diagram showing a rotary recording medium reproducing apparatus, with an outer frame disassembled, and with an embodiment of a height position adjusting device for a reproducing transducer according to the present invention.

As shown in FIG. 2, a reproducing apparatus 30 substantially comprises a jacket opening enlarging mechanism 31, a turntable 32 to rotate the disc 15 positioned thereon, a disc holding mechanism 33 for clamping the disc 15, a lid plate locking mechanism 34 for locking the lid plate 12, and the like.

The jacket opening enlarging mechanism 31 comprises upper and lower beams 36 and 37 extending in the directions of the arrows Y1 and Y2, and the supporting members 40 and 41 (sliders) which are respectively fixedly inserted into the guide rails 38 and 39, to support both ends of the respective beams 36 and 37.

A reproducing transducer 42 comprises a pickup device 45 including a cantilever 44 with a reproducing stylus 43 a resonator 46 and the like, and is mounted to a carriage 47. The carriage 47 has unitary flange parts at both sides thereof. The flanges have freely rotatable rollers 48a, 48b, and 49 respectively provided with grooves. The roller 49 rolls over a rail 51a on a chasis 50 of the reproducing apparatus, and the rollers 48a and 48b respectively roll over a rail 51b. Accordingly, the carriage 47 moves in the directions of arrows Y1 and Y2.

Figure 4:
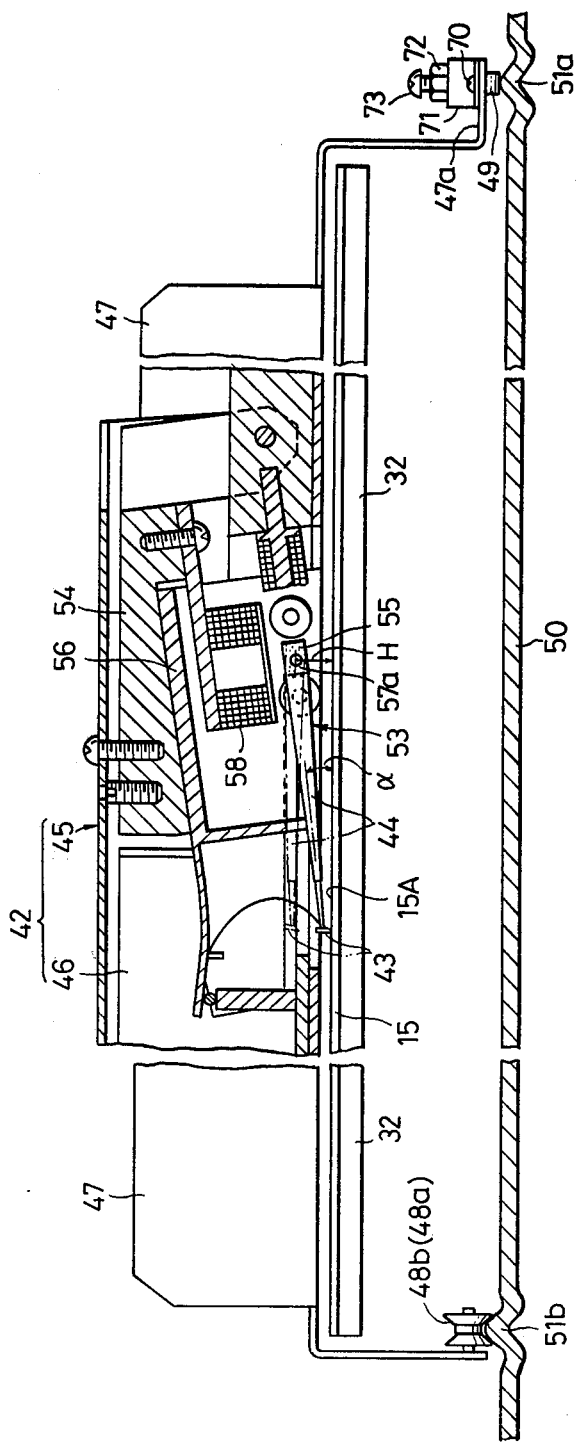
FIG. 4 is an elevation, with a part cut away, showing the device shown in FIG. 2 along lines IV—IV in a vertical cross section.

In the pickup device 45, a pickup cartridge 53 shown in FIG. 5 is inserted into a guide member 54 shown in FIG. 4. A permanent magnet piece 55 is fixedly inserted into a rear end part of the cantilever 44, to oppose a coil group. The rear end part of the cantilever 44 is held between a pair of arm portions 57a and 57b of a suspension 57 made of rubber. In a state where the pickup cartridge 53 is loaded, the reproducing stylus 43 and the cantilever 44 are at raised positions as indicated by two-dot chain lines in FIG. 4, and retreated within the carriage 47.

The disc holding mechanism 33 is provided at the inner part of the reproducing apparatus 30 on the opposite side of an inserting opening 60, and comprises a pair of upper and lower holding fingers 61.

Upon reproduction of the disc 15, the disc case 10 is inserted through the inserting opening 60 of the reproducing apparatus 30, by inserting the disc case 10 with the side of the lid plate 12 into the direction of the arrow X1. When the jacket opening enlarging mechanism 31 is pushed and moved in the direction of the arrow X1 by the disc case 10, the enlarging mechanism 31 moves, the upper and lower beams 36 and 37 rotate, and enlarging fingers 62 thus respectively move in directions which are mutually separated from each other. Accordingly, the tip ends of the enlarging fingers 62 engage with engaging windows 21 of the jacket 11, and enlarge the front part of the upper and lower jacket halves 13 upwards and downwards, to enlarge the opening.

The disc case 10 is inserted into the innermost part of the reproducing apparatus 30 together with the enlarging mechanism 31. Insertion is through the upper side of the turntable 32. Cutouts 22 of the lid plate 12 is locked by the lid plate locking mechanism 34. Hence, the lid plate 12 is locked and held at the innermost part of the reproducing apparatus 30.

Furthermore, engagement releasing members 63 enter inside the openings on the right and left sides of the disc case 10 (FIG. 1), and push the sloping surfaces at the tip ends of the engaging arms 18. Accordingly, the engaging arms 18 are respectively flexed inwardly, and the projections 19 respectively slip out from the depressions 20, to release the engagement of the lid plate 12 with respect to the jacket 11. Further, the disc 15 is held at a predetermined height by the holding fingers 61 (FIG. 2).

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 (FIG. 1) and the disc 15. Accompanied by this pulling out of the jacket 11, the lid plate 12 and the disc 15 are relatively pulled from within the jacket 11. The disc 15 is supported horizontally directly above the turntable 32 by the holding fingers 61 and a disc clamping mechanism 64 which is in a raised position, when the jacket 11 is completely pulled out from the reproducing apparatus 30.

When a start button 65 shown in FIG. 2 is pushed, the disc holding mechanism 33 releases the holding operation, and the disc clamping mechanism 64 is lowered. The disc 15 is lowered onto the turntable 32 which is parallel with the chassis 50, and is rotated towards the clockwise direction. Further, the pickup frame 42 moves in the direction of the arrow Y1 from a waiting position.

When the reproducing stylus 43 (FIG. 4) reaches the lead-in position of the disc 15, a current is supplied to a coil 58 for lowering the stylus. Accordingly, a rotational force in the counterclockwise direction in FIG. 4 is introduced in the permanent magnet piece 55. Hence, the cantilever 15 rotates in the counterclockwise direction to a position indicated by a solid line in FIG. 4, accompanied by the deformation in the arm portions 57a and 57b of the suspension 57, with the arm portions 57a and 57b as the center, to lower the reproducing stylus 43. The cantilever 44 thus becomes inclined by an angle α with respect to a recording surface 15A of the disc 15. The reproducing stylus 43 makes contact with the disc 15 at a normal position with a predetermined stylus pressure. Therefore, the rotating disc 15 is scanned by the reproducing stylus 43, and the recorded signal is reproduced from the recording surface of the disc 15.

Next, an operation in which the disc 15 is recovered from within the reproducing apparatus 30, will now be described.

Upon completion of the reproducing operation, the carriage 47 (FIG. 2) is moved in the direction of the arrow Y2, and returned to the original waiting position by a transferring mechanism 52. Moreover, the clamping mechanism 64 is raised to push the disc 15 up. In addition, the holding fingers 61 hold the disc 15 in the pushed-up position.

Upon recovering of the disc 15, an empty jacket 11 is again inserted into the reproducing apparatus 30 through the inserting opening 60, with the opening of the jacket 11 first. Thus, the enlarging mechanism 31 is pushed by the jacket 11 and moves in the direction of the arrow X1, to enlarge the opening of the jacket 11. As the jacket 11 is inserted in the direction of the arrow X1, the disc 15 is inserted into the jacket 11 through the opening of the jacket 11.

When the jacket 11 is inserted into the innermost position inside the reproducing apparatus 30, the disc 15 becomes completely incased within the jacket 11, and furthermore, the locked lid plate 12 is inserted within the opening of the jacket 11.

When the jacket 11 is inserted into the final position, the disc 15 is accommodated within the jacket 11. The main part of the lid plate 12, which has been locked, is inserted inside the jacket opening. Further, the lid plate locking mechanism 34 releases the lid plate 12.

Therefore, when the jacket 11 is pulled out in the direction of the arrow X2, the lid plate 12 moves in the direction of the arrow X2 together with the jacket 11. The disc 15 is pushed by the lid plate 12 and forcibly pushed out in the direction of the arrow X2 by the holding part. Accordingly, the disc 15 separates from the reproducing apparatus 30 to be recovered within the disc case 10.

Next, an embodiment of a height position adjusting device for a reproducing transducer according to the present invention, will be described in conjunction with FIGS. 6 and 7. As clearly understood from the descriptions above, the position at which the reproducing stylus 43 (FIG. 3) makes contact with and slides against the disc 15 and the stylus pressure of the reproducing stylus 43, respectively vary according to the height position of the rotary shaft of the cantilever 44. That is, the position and the stylus pressure of the reproducing stylus 43 respectively vary according to the height dimension of an axial line l of the arm portions 57a and 57b of the suspension 57, from the recording surface 15A of the disc 15 (or from the chassis 50). In a case where the height of the above axial line l is lower than a predetermined height H, the position at which the reproducing stylus 43 makes contact with and slides against the disc 15, is inclined away from a normal position and toward the relative scanning direction of the reproducing stylus 43, with respect to the disc 15. Accordingly, in this case, the stylus pressure applied to the reproducing stylus 43 is greater than a predetermined stylus pressure. On the other hand, in a case where the height of the axial line l is higher than the predetermined height H, the position at which the reproducing stylus 43 makes contact with and slides against the disc 15, is inclined in a direction opposite to the relative scanning direction which is of the reproducing stylus 43 with respect to the disc 15, namely a rotational direction of the disc 15, from the normal position. Hence, in this latter case, the stylus pressure applied to the reproducing stylus 43 is smaller than the predetermined stylus pressure.

When the height of the axial line l from an extended surface 15A1 of the recording surface 15A of the disc 15, is equal to the predetermined height H, the reproducing stylus 43 makes contact with and slides against the disc 15 at the normal upright position, with the desired stylus pressure applied to the reproducing stylus 43.

Particularly in FIGS. 3 and 4, the roller 49 is provided at a free end side of an elastic arm 71 which is fixed to the upper side of the flange 47a of the carriage 47, by a screw 70. The elastic arm 71 is formed and bent in the shape of a step, and is fixedly provided with a nut 72 at an intermediate position thereof. An adjusting screw 73 in the nut 72, and a lower end portion 73a of the adjusting screw 73 makes contact with the upper surface of the flange 47a.

When the length of the adjusting screw 73 projecting through the nut 72 increases, for example, the carriage 47 is displaced to approach the chassis 50, that is, the carriage 47 moves downwards, against the resilient force exterted by the elastic arm 71. On the other hand, when the length of the adjusting screw 73 projecting through the nut 72 decreases, for example, the carriage 47 moves upwards due to the resilient force exerted by the elastic arm 71. Therefore, the carriage 47 moves up and down with respect to the roller 49 with the fulcrum at the side of the rollers 48a and 48b, within the resilient deformation range of the elastic arm 71, by varying the projecting length of the adjusting screw 73. Hence the height position of the axial line with respect to the extended surface 15A1, is adjusted to the predetermined height H.

In a free state, the elastic arm 71 faces down, as shown by the two-dot chain line in FIG. 3. Thus, in a state where the adjusting screw 73 is screwed in, the elastic arm 71 is deformed upwards against the spring force exerted by the elastic arm 71 itself. Accordingly, the lower end portion 73a of the adjusting screw 73 presses against the flange 47a due to the above spring force exerted by the elastic arm 71. The weight of the carriage 47 acts to raise the screw 73 from the flange 47a; however, the above spring force exerted by the elastic arm 71 is considerably large. Hence, the adjusting screw 73 is maintained in a state in which the adjusting screw presses against the flange 47a. The axial line l of the arm portions 57a and 57b of the suspension 57 is thus held stable at the adjusted position.

Next, a description will be given with respect to an operation in which the above adjustment is actually performed.

Figure 6:
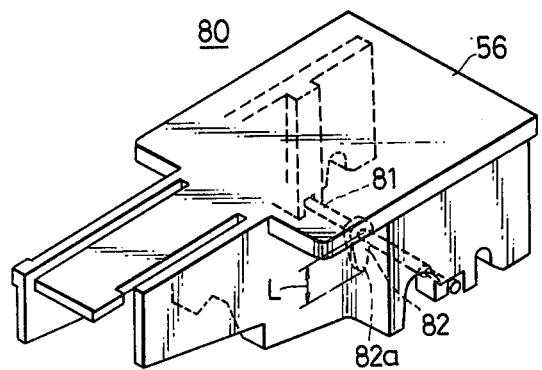
FIG. 6 is a perspective view showing a dummy pickup cartridge which is used when the height position of a reproducing transducer is adjusted.
Figure 7:
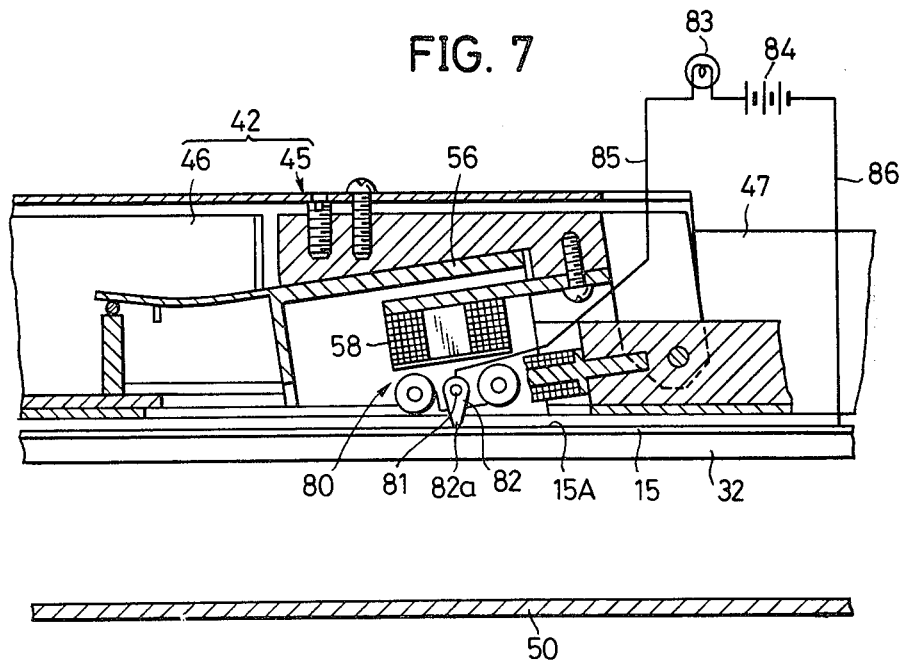
FIG. 7 is a diagram showing a state where the dummy pickup cartridge is loaded to adjust the height position of a reproducing transducer.

Upon adjustment, a dummy pickup cartridge 80 shown in FIG. 6 is loaded within the pickup device 45 as shown in FIG. 7. The dummy pickup cartridge 80 has a shaft 81 instead of the suspension 57, within a cartridge case 56. A conductive contact member 82 is freely rotatable on the shaft 81. A length L from a tip end 82a of the contact member 82 to the center of the above shaft 81, is set equal to the predetermined height H.

First, in performing the adjustment, the length of the adjusting screw 73 projecting through the nut 72 is set small, so that the height of the carriage 47, that is, the height of the axial line l is sufficiently higher than a target height, and the carriage 47 opposes the disc 15 placed on the turntable 32. This disc 15 is formed from a resin material into which particles of conductive material such as carbon are admixed, for example, and is a so-called uncoated disc which is not coated with a dielectric layer to the surface thereof, and is conductive.

The adjusting screw 73 is further turned in slowly and positively, to gradually lower the carriage 47. The contact member 82 is first separated from the disc 15, and a lamp 83 is turned OFF. However, when the carriage 47 is lowered, and the height of the axial line l reaches the predetermined height H, the tip end 82a of the contact member 82 makes contact with the recording surface 15a of the disc 15 which is conductive. Hence, a closed circuit comprising a power source 84, the lamp 83, a wire 85, the contact member 82, the disc 15, and a wire 86 is formed, and the lamp 83 is accordingly turned ON.

Since the lamp 83 is turned ON, it can be confirmed that the height of the carriage 47 has been adjusted to the target height, that is, the predetermined height H. Accordingly, the adjusting operation to adjust the height position of the carriage 47 is stopped, by stopping the turning of the adjusting screw.

The adjusting operation is performed by use of the dummy pickup cartridge 80, by observing the lamp 83. Accordingly, the correct adjustment can be simply performed, without introducing errors.

Moreover, the height position adjustment of the carriage 47 is performed under a condition which is hardly different from that upon reproduction of the disc 15. Hence, when the carriage 47 whose height position has already been adjusted is loaded into the pickup cartridge 53, the reproducing stylus 43 makes contact with and slides against the disc 15 at the normal position with the predetermined stylus pressure as shown in FIG. 4, upon reproduction. Therefore, the reproducing operation to reproduce the disc 15 can be finely performed.

In addition, after the adjustment has already been performed, there are cases where the carriage 47 is not parallel with respect to the chassis 50, but are inclined by a small angle. However, the reproducing stylus 43 also makes contact with and slides against the disc 15 at the normal position with the predetermined stylus pressure. Accordingly, the inclination of the carriage 47 does not introduce undesirable effects with respect to the reproducing operation.

Further, the contact member 82 which is axially supported on the shaft 81, is always vertically hanging downwards. Hence, even when the carriage 47 is inclined due to the adjusting operation, the carriage 47 is adjusted so that the height of the axial line l with respect to the recording surface 15A of the disc 15 is equal to the predetermined height H.

The above contact member 82 is supported in a manner such that the contact member 82 is freely rotatable within a plane perpendicular to the radial direction of the disc 15. Therefore, the above adjusting operation can also be performed in a state where the disc 15 is actually rotated.

In adjusting the height of the carriage 47, a conductive dummy disc having an upper surface whose height position is the same as that of the upper surface of the disc 15, can be used instead of the disc 15. In addition, the above height adjusting operation can be performed in a state where the turntable 32 is at a raised position so that the height of the upper surface of the turntable 32 corresponds to the height of the upper surface of the disc 15 placed onto the turntable 32, without using the disc 15 or the dummy disc. Moreover, the length of the contact member 82 can be increased by a length corresponding to the thickness of the disc 15. In this case, the device is constructed so that the height position adjustment is completed at the point in time when the contact member 82 makes contact with the turntable 32.

Further, the device according to the present invention can also be constructed to perform the above described height position adjustment with respect to the carriage 47, on the side of the guide rail 51b.

Moreover, the device can be constructed so that the adjusting screw is turned into the flange 47a from below the flange 47a, where the tip end of the adjusting screw pushed against the lower surface of the electric arm 71. In this particular case, the height position of the carriage 47 is adjusted by pushing up and resiliently deforming the elastic arm 71.

Further, this invention is not limited to these embodiments but various variations and modifications may be made without departing from the scope of the invention.

What is claimed is:

1. A height position adjusting device for a reproducing transducer means used in connection with a rotary recording medium reproducing apparatus, said transducer means reproducing an information signal recorded on a rotary recording medium and comprising a pickup cartridge said reproducing apparatus comprising means for transferring the transducer means in the radial direction across said rotary recording medium, said height position adjusting device comprising:

guide means in said reproducing apparatus;

carriage means for supporting said reproducing transducer means, said carriage moving along said guide means of said reproducing apparatus; said carriage having a basepart and height position adjusting means for adjusting the height position of said reproducing transducer means with respect to said rotary recording medium, by varying the height position of said carriage with respect to said guide means, said height position adjusting means comprising an arm having one end pivotally supported by said basepart of said carriage, adjusting screw means for adjusting a distance between said arm and the base part of said carriage, and a roller making contact with said guide means;

detecting means responsive to said height position adjusting means for detecting that said carriage has been adjusted to a predetermined height position with respect to said rotary recording medium, said detection means comprising a reference member and a contact member which makes electrical contact with said reference member when said carriage reaches a predetermined height position, said contact member being provided within a dummy pickup cartridge in a freely rotatable manner, and said contact member hanging downwardly due to its own weight, said dummy cartridge replacing said pickup cartridge of said reproducing transducer means upon height position adjustment of said reproducing transducer means.

* * * * *